United States Patent [19]

Huang

[11] 4,361,136
[45] Nov. 30, 1982

[54] CONCENTRIC SOLAR COLLECTOR

[76] Inventor: Linus Huang, 10-4 Fl., No. 62, Chang Chun Rd., Taipei, Taiwan

[21] Appl. No.: 181,358

[22] Filed: Aug. 26, 1980

[51] Int. Cl.³ .............................................. F24J 3/02
[52] U.S. Cl. .................................................. 126/438
[58] Field of Search ............... 126/438, 418, 450, 426; 165/162, 171, 168; 350/288, 299

[56] References Cited

U.S. PATENT DOCUMENTS 4,011,855 3/1977 Eshelman ............................ 126/438
4,249,515 2/1981 Page .................................... 126/438

Primary Examiner—Samuel Scott
Assistant Examiner—Randall L. Green

[57] ABSTRACT

A concentric solar collector comprises a round disk, an insulating substrate moulded with plurality of concentric parabolic troughs, a reflective plate formed as plurality of concentric parabolic troughs, a coiled absorber pipe, plurality of vertical heat-transfer plates each connecting the coiled absorber pipe and the parabolic trough positioned thereunder and a transparent top envelope. Such a collector can be used to efficiently absorb the solar heat either from direct straight sunlight or inclined sunlight.

3 Claims, 7 Drawing Figures

CONCENTRIC SOLAR COLLECTOR

BACKGROUND OF THE INVENTION

The conventional flat-plate solar collectors are widely used in solar heating apparatus. Such a conventional collector is shown in FIG. 6 in that, the heat collected by absorber A is derived from the absorbed heat turned by straight light DL and the heat conducted from the plate R as exposed to straight sunlight DL' and inclined light IL. However, major sunlights either straight light DL' or inclined light IL are reflected from the collector plate R and only minor sunlights are absorbed by the plate R which then conducts the absorbed heat to the absorber A. Hence, the heat-collection efficiency of conventional flat-plate collector as FIG. 6 shown will be greatly reduced as reflection loss.

The conventional optical-type concentrator is shown in FIG. 7. Such a conventional configuration as FIG. 7 shown proposes a parabolic trough concentrator of which a heat pipe (absorber) A is mounted along the focal line of parabolic trough. Said trough serves as a reflective surface R. The direct straight sunlight DL will be reflected through said surface to focus on said absorber A. However, the indirect or inclined light IL will not focus on said absorber so that the collector efficiency will be deducted. If mounting said concentrator on a tracking mechanism (axis of rotation coinciding with the focal line of concentrator), the concentrator will always track the sun so that the collector efficiency will be raised. However, the initial cost to add such a tracking device will be more increased. For general applications, using such a solar collector with higher initial construction cost will not be economic.

SUMMARY OF THE INVENTION

One object of the present invention is to provide a concentric solar collector in which the reflective plate is formed as plurality of concentric parabolic troughs and a coiled absorber pipe is continuously wound along every focal circle line on each parabolic trough so that the solar heat will be efficiently collected on said coiled absorber.

Another object of the present invention is to provide a concentric solar collector comprising plurality of vertical heat-transfer plates in that each circular vertical plate connects the absorber pipe along the focal line of every parabolic trough and the parabolic trough positioned directly under said absorber pipe so as to further conduct the heat absorbed on said plate to the absorber pipe.

DESCRIPTION OF THE PREFERRED EMBODIMENTS

Figure 1:
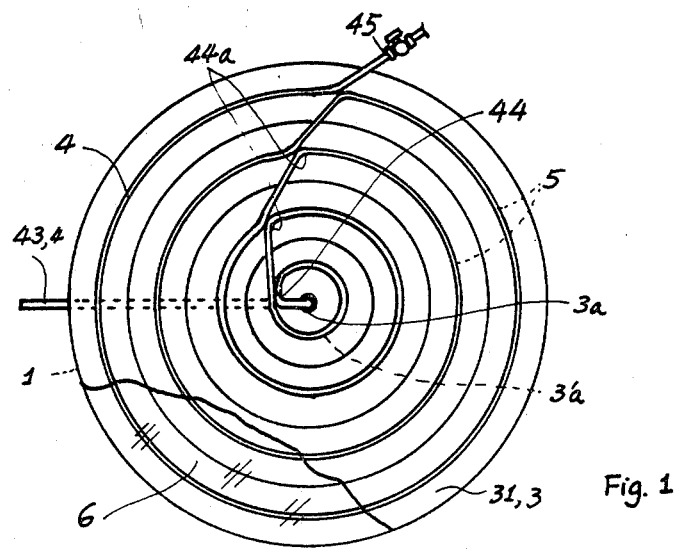
FIG. 1 is a top view drawing of the collector in accordance with the present invention.
Figure 2:
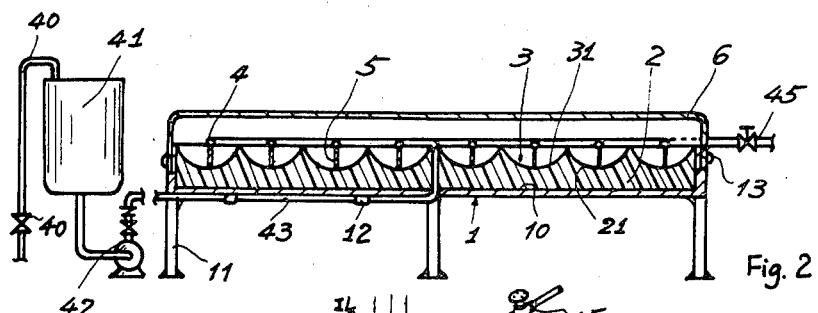
FIG. 2 is a partial sectional drawing of the present invention.
Figure 3:
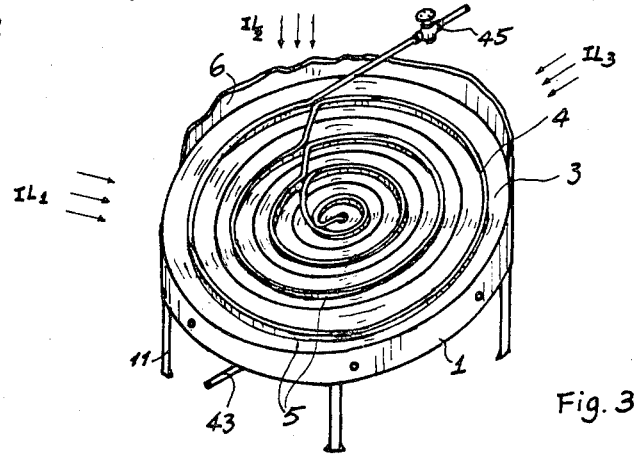
FIG. 3 is a perspective illustration showing the collector of the present invention.

As shown in FIGS. 1, 2 and 3, a preferred embodiment of the present invention comprises a round disk 1, an insulating substrate 2, a reflective plate 3, a coiled absorber pipe 4, plurality of vertical heat-transfer plates 5 and a transparent top envelope 6.

Said round disk 1 is formed with a round recess 10 to insert and bond said insulating substrate 2 by adhesive. Several supporting legs 11 are provided to fix said collector. Brackets 12 are provided to fix the inlet pipe 43 of said coiled absorber pipe 4 on said disk 1. Rivets 13 are provided to install said top envelope 6 on said disk 1. Said disk 1 serves as a base of the present collector.

Said insulating substrate 2 is moulded to form plurality of concentric parabolic troughs 21 in which each corresponds to and engages with every concentric parabolic trough 31 of said reflective plate 3. The insulating material can be chosen from the available insulating plastic resin and fiber glass cloth.

Said reflective plate 3 is moulded into plurality of concentric parabolic troughs 31 each corresponding to each trough 21 of said insulating substrate 2. Said plate 3 may be made from aluminum plate or by depositing aluminum and silicon oxide on an acrylic carrier to form an integrated plate. Said plate 3 is bonded onto said insulating substrate 2 by adhesive.

Said coiled absorber pipe 4 may be made from copper or other metals having good heat conductivity. Said absorber pipe 4 is led into the collector through a piping system comprising a supply pipe 40, a reservoir 41, a pump 42 and inlet pipe 43.

Said absorber pipe 4 is then inserted through disk 1, substrate 2 and the center 3a of said reflective plate 3 to begin its winding as shown in FIG. 1 and 3. The absorber pipe 4 is drawn from the center 3a and then bent at angle 44 to form first absorber circle along the focal circle line 3a'. Then, the absorber pipe 4 is drawn outwards to the adjacent outer trough 31 and bent at angle 44a to wind another circle. By the way, said absorber pipe 4 will be wound continuously so that every circle of absorber pipe 4 may coincide with each focal circle line of every concentric trough 31. The bending angles 44, 44a are preferably ranging from 90° to 180°. Acute angle less than 90° should be prevented as it will increase the friction loss of internal fluid flowing within said pipe 4. After leaving the collector, the pipe 4 should be coated with insulating material 45 to prevent from heat loss.

The vertical heat-transfer plate 5 is provided to connect the absorber pipe 4 and the trough 31 positioned thereunder by solder welding. Each plate 5 is mounted along every focal circle line 3a'. Said plate 5 have twofold purposes for conducting heat to pipe 4 and for supporting the pipe 4 on the collector. It can be made from copper. The plate 5 and pipe 4 can be coated with thinner black heat-absorbing material to enhance their heat-absorption efficiency.

Said top envelope 6 may be made from poly-carbonate or glass to prevent from wind-cooling or weather attack in use.

Figure 4:
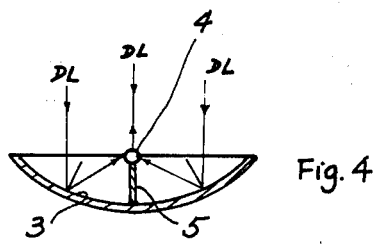
FIG. 4 is a sectional drawing showing the focusing of sunlight in accordance with the present invention.
Figure 5:
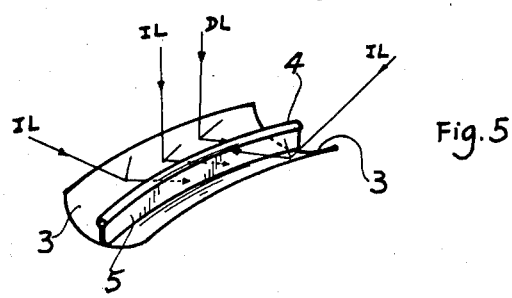
FIG. 5 is a partial perspective illustration showing the reflection and absorption of sunlight in accordance with the present invention.
Figure 6:
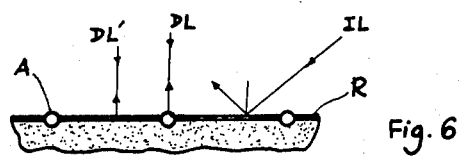
FIG. 6 is a sectional drawing showing the absorption and reflection of conventional flat-plate collector.
Figure 7:
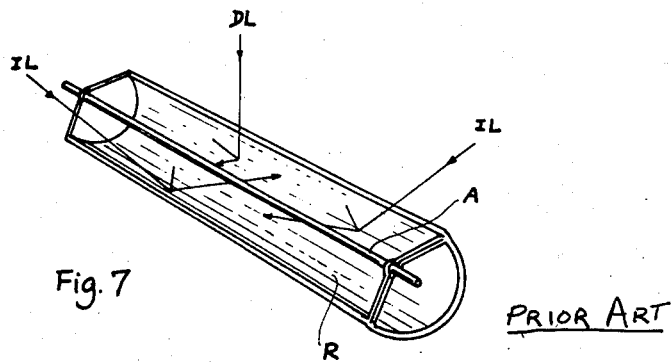
FIG. 7 is a perspective illustration showing conventional optical-type concentrator.

When using the present collector, the fluid such as water is pumped through reservoir 41 into absorber pipe 4 and then delivered through the coiled absorber pipe 4, the direct straight solar light will focus on said pipe 4 to turn into heat for heating internal fluid (FIG. 4). If the sun is not projecting its light perpendicular to the collector, most of the inclined incidence lights may be reflected by said troughs 31 to said absorber pipe 4 and vertical plate 5 which will conduct the absorbed heat into pipe 4. Hence, the heat coming into pipe 4 is derived from the radiation heat absorbed on pipe 4 and the secondary conduction heat transferred from said vertical plate 5 thereby increasing the total heat transferred into internal fluid within the pipe 4 and raising the collector efficiency accordingly (FIG. 5). The heated fluid in pipe 4 will then be discharged for end-use.

The coiled absorber pipe 4 may also be subsequently led from outer trough 31 to the inner troughs until reaching the center 3a of the collector where the heated fluid is discharged therefrom. The absorber pipe 4 is wound in a direction opposite to the aforementioned one so as to form another preferred embodiment.

The present collector is installed horizontally for general solar heating applications. It may also be further modified to add tracking means to increase its efficiency by those skilled in the art.

The present invention as compared with the conventional collectors has the following advantages:

1. The solar energy is collected more efficiently because both the focal absorber pipe 4 and the vertical heat-transfer plate 5 may collect much solar heat to reduce the reflection heat loss.

2. The absorber pipe 4 is formed coil-like configuration. The bending angles 44, 44a are large enough to reduce the friction loss as delivering the internal fluid. The absorber pipe 4 is formed smoothly and continuously so that it will neglect the friction loss as both of contraction loss from header into multiple tubes or expansion loss from tubes into header as found in conventional multiple-tube collectors.

3. The present collector is formed circular so that the heat-collection efficiency of different inclined incidence lights coming from different projecting directions or angles may be equal or approaching equal. It means that the inclined incidence lights $IL_1$, $IL_2$ and $IL_3$ shown in FIG. 3 may have the same or similar collector efficiency. By the way, such a collector may have higher and averaged collection efficiency than that of any conventional collector without tracking device. Contradictorily, a flat-plate collector, for instance, is always constructed to arrange the multiple heat tubes on a slope frame in that if the surface of the slope frame is not directly facing to sun light, the collector efficiency will be greatly deducted.

I claim:

1. A concentric solar collector comprising a round disk, an insulating substrate, a refective plate, a coiled absorber pipe, plurality of vertical heat-transfer plates and a transparent top envelope said round disk serving as a base and being formed as a round recess to insert and bond said insulating substrate, said insulating substrate being moulded to form plurality of concentric parabolic troughs facing upwards, said reflective plate being moulded with plurality of concentric parabolic troughs each corresponding to and engaged with each trough of said insulating substrate which is bonded under said reflective plate by adhesive, said coiled absorber pipe being led from an outside piping system to pass through said round disk, said substrate and the center of said reflective plate and then wound at a bending angle to extend along the focal circle line on the reflective trough and subsequently wound outwards to form a continuous coiled absorber pipe passing from inner trough to outer adjacent troughs and mounting along every focal circle line of each trough and finally being packed or coated with insulating material after leaving the collector for end-use connection, each of said plurality of vertical heat-transfer plates respectively connecting said coiled absorber pipe on each focal circle line and the parabolic trough positioned perpendicularly under said coiled pipe and said transparent top envelope being covered on said collector.

2. A concentric solar collector according to claim 1, in that, said coiled absorber pipe can be subsequently led from the outer trough to the inner troughs and discharged from the collector center in a winding direction opposite to that shown in claim 1.

3. A concentric solar collector according to claim 1, in that said bending angle of said coiled absorber pipe is preferably ranging from 90° to 180°.

* * * * *